Sept. 4, 1945.　　　　D. R. CLARK　　　　2,384,237
AMUSEMENT MACHINE
Filed May 27, 1944　　　5 Sheets-Sheet 1

Witness:
Geo L. Chapel

Inventor
Daniel R. Clark.

By Rice and Rice
Attorneys

Sept. 4, 1945. D. R. CLARK 2,384,237
AMUSEMENT MACHINE
Filed May 27, 1944 5 Sheets-Sheet 2

Witness:
Geo L. Chapel

Inventor
Daniel R. Clark.
By Rice and Rice
Attorneys

Sept. 4, 1945.                D. R. CLARK                2,384,237
                            AMUSEMENT MACHINE
                          Filed May 27, 1944              5 Sheets-Sheet 3

Witness:
Geo L. Chapel

Inventor
Daniel R. Clark.

By Rice and Rice
Attorneys

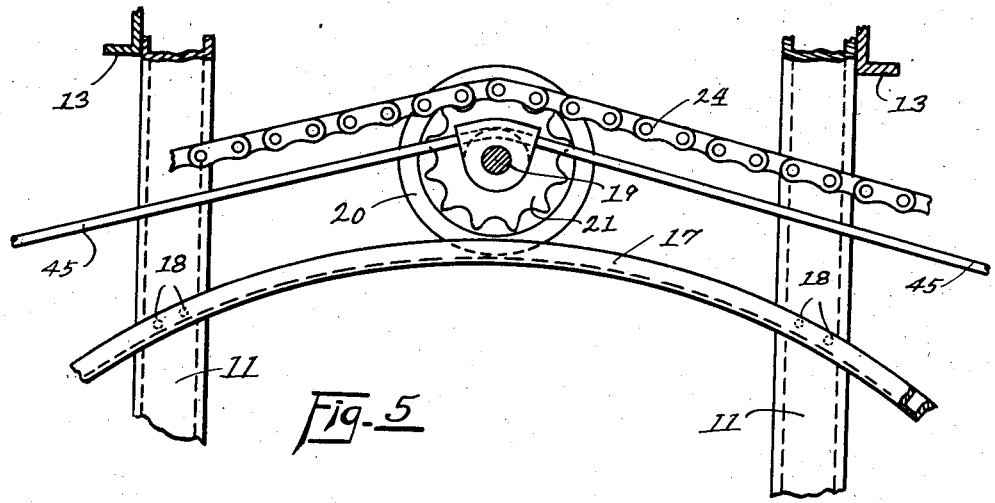
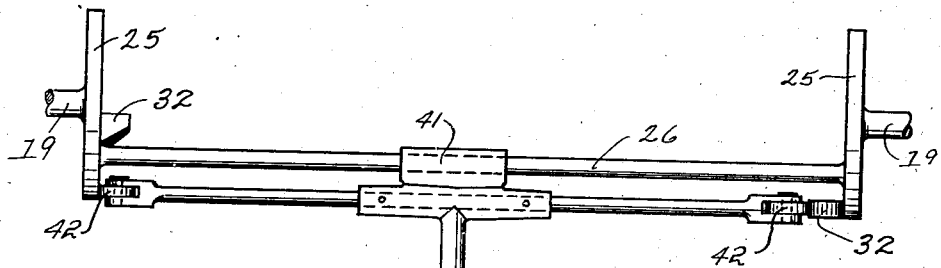
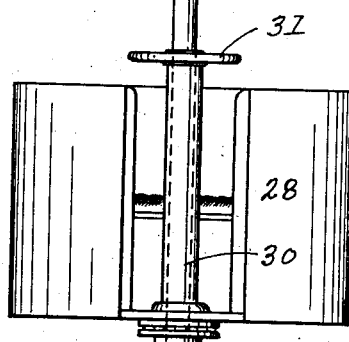

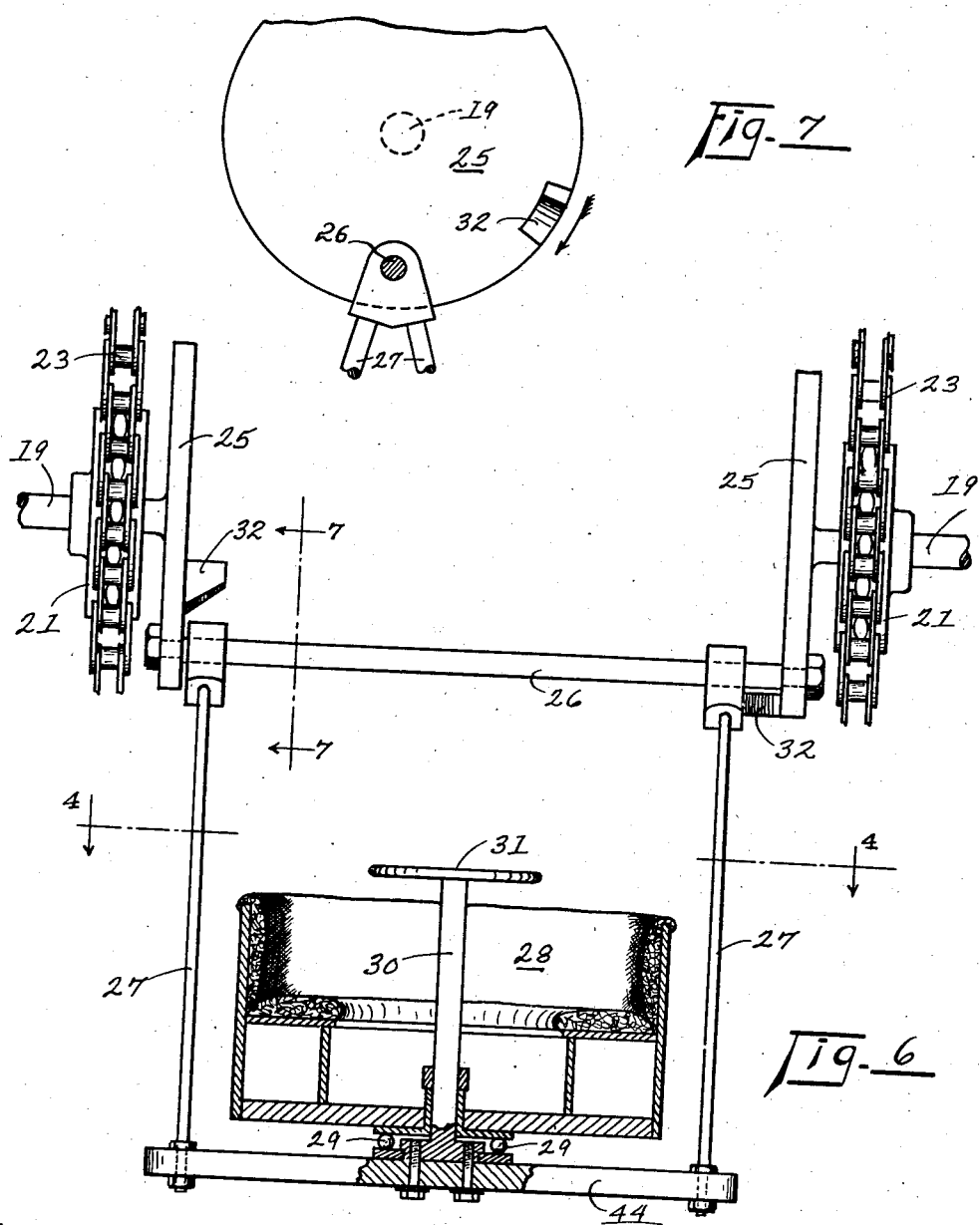

Patented Sept. 4, 1945

2,384,237

UNITED STATES PATENT OFFICE 2,384,237

AMUSEMENT MACHINE

Daniel Richard Clark, Flint, Mich.

Application May 27, 1944, Serial No. 537,681

3 Claims. (Cl. 272—36)

The present invention relates to amusement machines and more particularly to so-called machines of the Ferris wheel type such as are generally seen at carnivals, fairs and the like.

The primary objects of the instant invention are to provide a machine of the general character above indicated whereby passengers riding in the several carriages thereof are provided with a novel type ride; to provide such a machine whereby the passengers riding in the several carriages are all not only wheeled in vertical circular fashion but are likewise wheeled in a smaller vertical rotative movement during the rotation of the Ferris wheel; to provide such a machine whereby the several carriages and their occupants are periodically alternately moved transversely of the rotative travel of the carriage; to provide such a machine whereby the passengers occupying the several carriages may themselves rotate their carriage on its axis; to provide such a machine whose several carriages are swingably suspended; to provide such a machine whose carriages are adapted to provide five separate movements; and, to provide such a machine which is novel in its construction and reasonably economical in manufacture.

Illustrative embodiments of the invention are shown in the accompanying drawings, wherein—

Figure 5 is an enlarged sectional view on line 5—5 of Figure 2 showing the frame, its channeled circular track and one of the several sprocket wheels rotated thereon by means of a driven sprocket chain;

Figure 6 is an enlarged view of one of the several carriages and its mechanism for wheeling it in its smaller rotative movement and for transversely periodically shifting the carriage;

Figure 7 is a sectional view on line 7—7 of Figure 6; and

Figure 8 is a modified form of one of the several carriages of the machine and its mechanism for wheeling it in its smaller rotative movement and for transversely periodically shifting the carriage.

Referring then to the drawings wherein like parts of the structure shown are designated by the same numerals in the several views, the machine there shown has two pairs of parallelly spaced apart vertically disposed I-beams 10, 11, each pair being secured together at their lower ends by a transverse angle iron member 12 and at their upper ends by a rectangular frame member 13 in any suitable fashion as by rivets 14.

Figure 1:
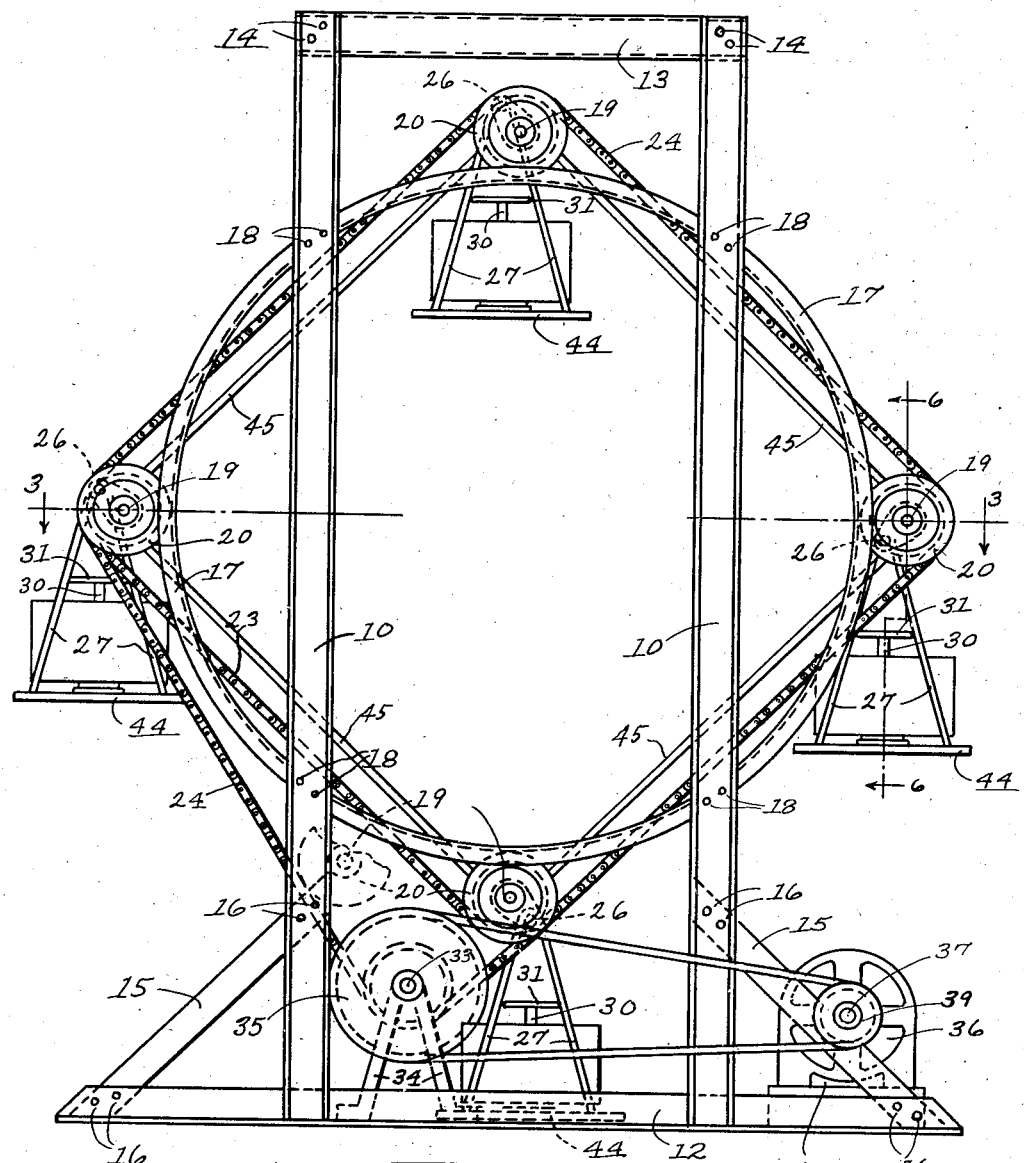
Figure 1 is a side elevational view of the machine.

Each pair of parallel vertically disposed I-beams 10, 11 and its transversely secured angle iron member 12 is braced by a pair of angularly disposed members 15, each fixedly secured at its lower end to an outer end of an angle iron member and at its upper end to an I-beam 10, 11 as by rivets 16, all as best shown in Figure 1.

A pair of circular vertically disposed channel bar tracks 17 are each secured in parallel spaced relationship with respect to each other to a pair of spaced apart vertically disposed I-beams 10 and 11 as by rivets 18 and as best shown in Figures 1 and 5.

A plurality of spaced horizontally disposed shafts 19, each having a roller 20 rotatably secured at its outer end and adapted to travel within a circular track 17 as best shown in Figures 1, 2, 3 and 5, are each provided with a pair of spaced apart vertically disposed sprocket wheels 21, 22 non-rotatably secured thereto and a plurality of stretchers or tie-rods 45 are secured at their opposite ends to a shaft 19 and intermediate proximate sprocket wheels 21, 22 in any suitable manner to provide strength and rigidity to the structure.

Figure 2:
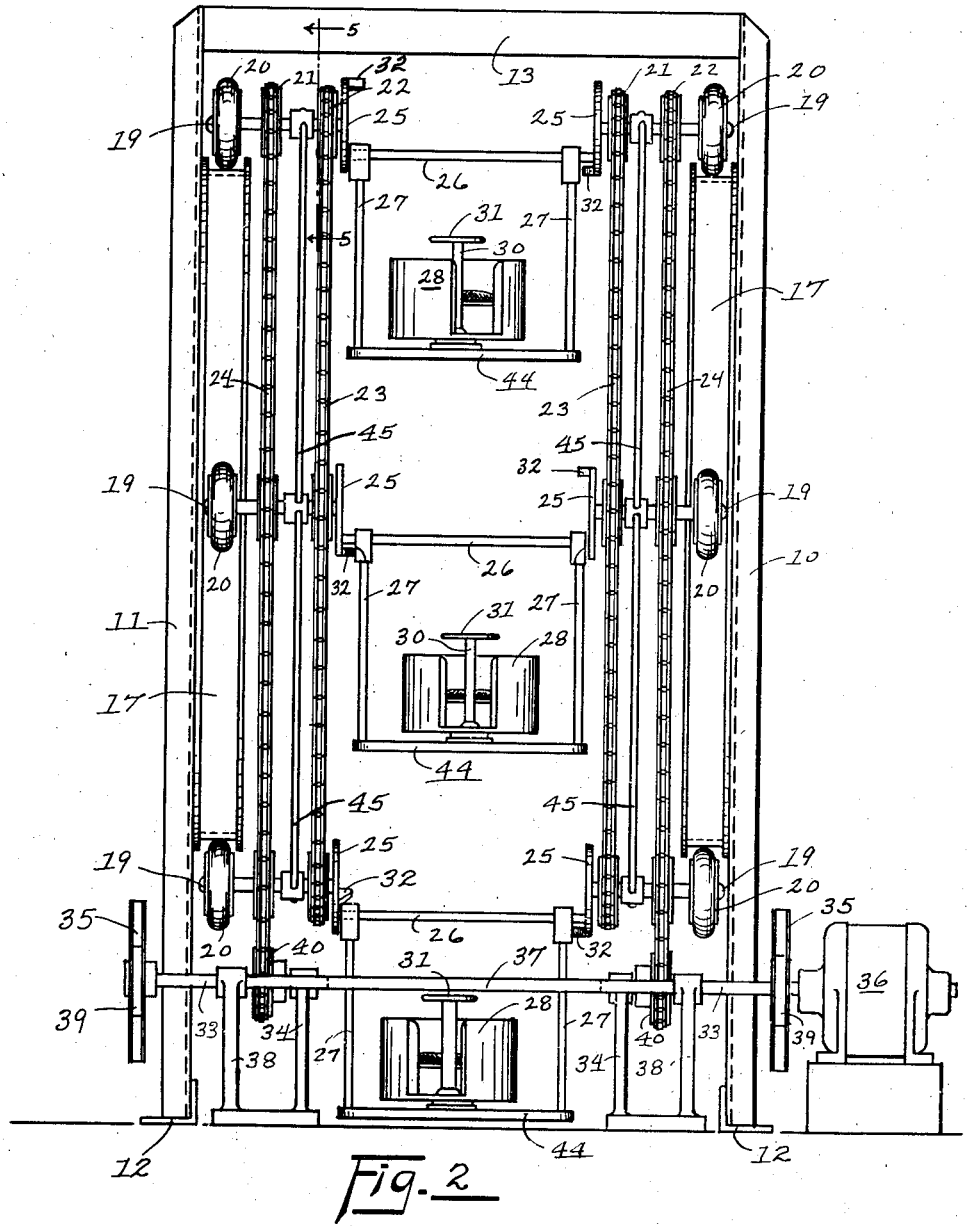
Figure 2 is an end elevational view thereof.
Figure 4:
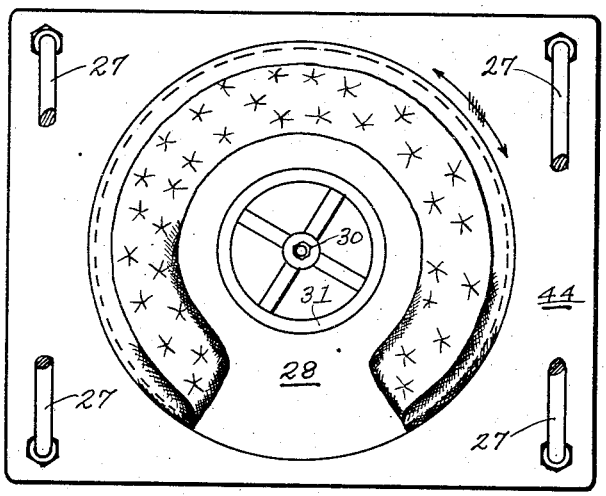
Figure 4 is an enlarged top plan view of one of the several carriages on line 4—4 of Figure 6.
Figure 3:
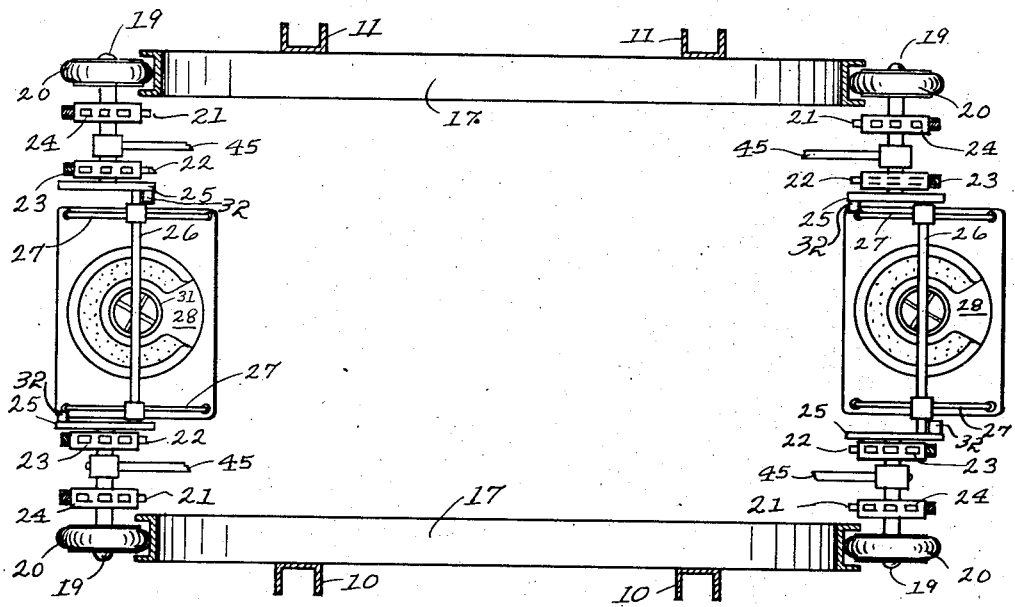
Figure 3 is a fragmentary sectional view on line 3—3 of Figure 1.

A pair of sprocket chains 23, 24 are carried by each set or series of sprocket wheels 21, 22 as best shown in Figures 2 and 3 and the inner end of each shaft 19 is provided with fixedly secured disc 25. Interposed between each proximate pair of companion discs 25 there is a shaft 26 fixedly secured eccentrically therebetween and as best shown in Figures 2, 6 and 7.

A carriage for passengers of the machine comprises a pair of spaced apart angularly depending arms 27, each swingably and transversely shiftably suspended from a shaft 26 and to each of whose lower ends is rigidly secured a platform 44.

A seat 28 for one or more passengers is rotatably supported on the platform 44 as by ball-bearings 29 as best shown in Figure 6 and a vertically disposed shaft 30, fixedly secured to the platform at its lower end is provided with a passenger-operated fixedly secured hand wheel 31 at its upper end whereby a passenger in the carriage may rotate the same by manually turning the hand wheel.

Each disc 25 is provided with a cam 32 adjacent its periphery and on its inner side as best shown in Figures 2, 6, 7 and 8, the cam on each pair of proximate discs being adapted to alternately engage the upper end of a depending arm 27 during the rotation of a pair of proximate companion discs whereby the carriage is laterally shifted to its positions shown in Figures 6 and 8 and thereafter reversely shifted on continued rotation of a pair of proximate companion discs.

A horizontally disposed shaft 33 rotatably supported on spaced apart bearing brackets 34 is provided at each of its opposite ends with a pulley wheel 35 and motive power for driving said shaft, such as the electric motor 36, is provided with a shaft 37, rotatably supported on spaced apart brackets 38, to whose opposite ends is secured a pulley wheel 39.

Spaced sprocket wheels 40 secured to the shaft 33 between the pulley wheels 35 each carry a sprocket chain 24 whereby rotation of the shaft 33 by the motor 36 effects the rotation and alternate periodic lateral shifting of the several carriages as hereinbefore described.

In the modified construction shown in Figure 8, the carriage is suspended from a hanger 41 swingably supported on the rod 26 and the outer ends of the hanger are each provided with a roller 42, each alternately engaged by a cam 32 on its proximate disc 25 during rotation of companion pairs of discs to alternately laterally shift the carriage.

Operation

In operation, rotation of the shaft 33 by means of the motor 36 as hereinbefore described effects the several rotations and alternate periodic lateral shifting of the several carriages. The carriages may likewise be manually rotated by a passenger by means of the hand wheel 31 and since each carriage is swingably suspended, each carriage is adapted to provide five separate movements.

These five movements are (1) a movement of the several carriages in a large vertical circular fashion, (2) a movement of the several carriages in a smaller vertical circular fashion, (3) a periodic alternating transverse movement of the several carriages, (4) a swinging movement of the several carriages, and (5) a passenger operated horizontally rotatable movement of the several carriages.

It will thus be seen that the machine herein shown and described is novel in construction and reasonably economical in manufacture and while but two embodiments of the invention have been herein shown and described, it will be understood that certain details of the constructions shown may be altered or omitted without departing from the spirit of the invention as the same is defined by the following claims.

I claim:

1. In a machine of the class described, a vertically disposed frame having parallelly disposed spaced apart members, a circular vertically disposed track member secured to each frame member on its inner side, a plurality of spaced apart horizontally disposed shafts each having a roller rotatably secured at its outer end and adapted to travel on a circular track, each shaft having a pair of spaced apart fixedly secured and vertically disposed sprocket wheels, a plurality of stretchers each secured at its opposite end to a shaft, sprocket chains carried by each pair of sprocket wheels, a disc fixedly secured to each shaft, a shaft fixedly secured eccentrically between each proximate pair of discs, a carriage swingably suspended from each latter shaft, and means for driving the sprocket chains.

2. In a machine of the class described, a vertically disposed frame having parallelly disposed spaced apart members, a circular vertically disposed track member secured to each frame member on its inner side, a plurality of spaced apart horizontally disposed shafts each having a roller rotatably secured at its outer end and adapted to travel on a circular track, each shaft having a pair of spaced apart fixedly secured and vertically disposed sprocket wheels, a plurality of stretchers each secured at its opposite end to a shaft, sprocket chains carried by each pair of sprocket wheels, a disc fixedly secured to each shaft, a shaft fixedly secured eccentrically between each proximate pair of discs, a carriage swingably suspended from each latter shaft and laterally shiftable thereon, and means for driving the sprocket chains.

3. In a machine of the class described, a vertically disposed frame having parallelly disposed spaced apart members, a circular vertically disposed track member secured to each frame member on its inner side, a plurality of spaced apart horizontally disposed shafts each having a roller rotatably secured at its outer end and adapted to travel on a circular track, each shaft having a pair of spaced apart fixedly secured and vertically disposed sprocket wheels, a plurality of stretchers each secured at its opposite end to a shaft, sprocket chains carried by each pair of sprocket wheels, a disc fixedly secured to each shaft, a shaft fixedly secured eccentrically between each proximate pair of discs, a carriage swingably suspended from each latter shaft and laterally shiftable thereon, a seat rotatably mounted on the carriage, and means for driving the sprocket chains.

DANIEL RICHARD CLARK.